(12) United States Patent
Zhu et al.

(10) Patent No.: US 8,799,306 B2
(45) Date of Patent: Aug. 5, 2014

(54) RECOMMENDATION OF SEARCH KEYWORDS BASED ON INDICATION OF USER INTENTION

(75) Inventors: Li Zhu, Hangzhou (CN); Xiaocong Zhu, Hangzhou (CN)

(73) Assignee: Alibaba Group Holding Limited (KY)

( * ) Notice: Subject to any disclaimer, the term of this patent is extended or adjusted under 35 U.S.C. 154(b) by 294 days.

(21) Appl. No.: 13/335,201

(22) Filed: Dec. 22, 2011

(65) Prior Publication Data

US 2012/0173562 A1 Jul. 5, 2012

(30) Foreign Application Priority Data

Dec. 31, 2010 (CN) .......................... 2010 1 0618555

(51) Int. Cl.
*G06F 17/30* (2006.01)

(52) U.S. Cl.
CPC ................................. *G06F 17/3064* (2013.01)
USPC ............................ 707/759; 707/769; 707/771

(58) Field of Classification Search
USPC ......................................... 707/759, 769, 771
See application file for complete search history.

(56) References Cited

U.S. PATENT DOCUMENTS

| 6,502,091 | B1 | 12/2002 | Chundi et al. |
|---|---|---|---|
| 6,567,797 | B1 | 5/2003 | Schuetze et al. |
| 6,845,374 | B1 | 1/2005 | Oliver et al. |
| 7,092,936 | B1 | 8/2006 | Alonso et al. |
| 7,149,804 | B2 | 12/2006 | Chatani |
| 7,428,529 | B2 | 9/2008 | Zeng et al. |
| 7,577,665 | B2 | 8/2009 | Ramer et al. |
| 7,590,651 | B2 | 9/2009 | Fujio et al. |
| 7,689,554 | B2 | 3/2010 | Jones et al. |
| 7,725,453 | B1 | 5/2010 | Chen et al. |
| 7,734,641 | B2 | 6/2010 | Kanigsberg et al. |
| 2003/0149704 | A1 | 8/2003 | Yayoi et al. |
| 2005/0055341 | A1 | 3/2005 | Haahr et al. |
| 2006/0020591 | A1 | 1/2006 | Kommers et al. |
| 2006/0129531 | A1 | 6/2006 | Bates |
| 2006/0156326 | A1 | 7/2006 | Goronzy et al. |
| 2006/0253427 | A1 | 11/2006 | Wu et al. |

(Continued)

FOREIGN PATENT DOCUMENTS

| CN | 101241512 A | 8/2008 |
|---|---|---|
| CN | 101751437 A | 6/2010 |

(Continued)

OTHER PUBLICATIONS

Cui et al., "Query Expansion by Mining User Logs", IEEE Transactions on Knowledge and Data Engineering, vol. 15, No. 4, Jul./Aug. 2003, pp. 829-839.

*Primary Examiner* — Mahesh Dwivedi
(74) *Attorney, Agent, or Firm* — Van Pelt, Yi & James LLP

(57) ABSTRACT

Search keyword recommendation includes: receiving a set of search keywords input by a user; determining whether the set of search keywords indicate a clearly defined intention by the user, including comparing the set of search keywords with a plurality of predetermined words corresponding to intentions that are not clearly defined; in the event that the set of search keywords are determined not to indicate a clearly defined intention, executing a first recommendation method to obtain recommended search keywords; wherein: the first recommendation method is selected among a plurality of recommendation methods; and the first recommendation method includes a knowledge-based recommendation method, a session correlation-based method, or a combination.

21 Claims, 10 Drawing Sheets

(56) References Cited

U.S. PATENT DOCUMENTS

| | | |
|---|---|---|
| 2007/0067279 A1 | 3/2007 | Bonabeau et al. |
| 2007/0118512 A1 | 5/2007 | Riley et al. |
| 2007/0276807 A1 | 11/2007 | Chen et al. |
| 2008/0091670 A1 | 4/2008 | Ismalson |
| 2008/0222119 A1 | 9/2008 | Dai et al. |
| 2008/0301089 A1 | 12/2008 | Makeev |
| 2009/0259646 A1 | 10/2009 | Fujita et al. |
| 2009/0299991 A1 | 12/2009 | Zarzar et al. |
| 2010/0138400 A1 | 6/2010 | Curtis et al. |
| 2010/0179948 A1 | 7/2010 | Xie et al. |
| 2010/0179956 A1 | 7/2010 | Jammalamadaka et al. |
| 2010/0293174 A1 | 11/2010 | Bennett et al. |
| 2011/0035397 A1* | 2/2011 | Joshi et al. .................. 707/759 |
| 2011/0066650 A1* | 3/2011 | Fuxman et al. ............... 707/776 |
| 2011/0078127 A1* | 3/2011 | Lin et al. ..................... 707/706 |
| 2011/0208730 A1* | 8/2011 | Jiang et al. ................... 707/727 |
| 2011/0302172 A1* | 12/2011 | Chandrasekar et al. ...... 707/748 |
| 2011/0314012 A1* | 12/2011 | Kenthapadi et al. .......... 707/731 |
| 2012/0226641 A1* | 9/2012 | Hu et al. ....................... 706/12 |
| 2012/0239679 A1* | 9/2012 | Gupta ........................... 707/767 |

FOREIGN PATENT DOCUMENTS

| | | |
|---|---|---|
| JP | 7219957 | 8/1995 |
| JP | 200292033 | 3/2002 |
| JP | 2002092033 | 3/2002 |
| JP | 200531949 | 2/2005 |
| JP | 2008176746 | 7/2008 |

* cited by examiner

RECOMMENDATION OF SEARCH KEYWORDS BASED ON INDICATION OF USER INTENTION

CROSS REFERENCE TO OTHER APPLICATIONS

This application claims priority to People's Republic of China Patent Application No. 201010618555.4 entitled A METHOD AND DEVICE FOR RECOMMENDING SEARCH KEYWORDS filed Dec. 31, 2010 which is incorporated herein by reference for all purposes.

FIELD OF THE INVENTION

The present application relates to the field of information searching technology. In particular, it relates to the recommendation of search keywords.

BACKGROUND OF THE INVENTION

Existing search engines generally provide a search keyword recommendation feature. For example, in some web-based engines, the user inputs a search keyword in the search field, and after he or she clicks on a "search" button, the page that the system jumps to not only contains search results, but also includes other search engine-recommended search keywords or search keyword combinations that are related to the search keywords input by the user. Or, as the user inputs search keywords in the search field, recommended search keywords related to the user input search keywords will pop up in the search field's pulldown menu so that a search can be conducted after the user selects a recommended search keyword.

The existing schemes for recommending search keywords are generally based on search logs. Search keywords in the search log that have higher correlations with search keywords input by the user serve as recommended search keywords. The basic principle is as follows:

First, a search log is established. The search keywords contained in a search log typically have the following sources: first, every search keyword entered in search fields by users; second, the search keywords recommended by search engines. The values of the importance parameters corresponding to the search keywords in the search log are also determined. The values of the importance parameters corresponding to the search keywords in the search log are primarily decided by the factors below. Specifically, the value of each search keyword importance parameter can be determined by applying the weighted sum method to all factors:

1. Click factors, i.e., whether or not there is a record indicating that the search keyword search results were clicked by the user, the number of clicks, and click ranks Specifically, if a user uses a search keyword only to conduct a search and does not click on a web page link in the search results, then the click factor parameter value for this search keyword will be relatively low, e.g., the preset parameter value for this factor is 0. If a user uses a search keyword to conduct a search and then clicks on a search result, the click factor parameter value for this search keyword will be relatively high, e.g., the preset parameter value for this factor is the number of times that the search results are clicked. If there is a click record for search keywords, then the more clicks there are, the higher the click parameter value will be for that search keyword, with the result that the weighted sum value of the importance parameter will be higher.

2. Quality factors of the search keyword. Search keyword quality factors include search keyword length, number of semantic terms, and inclusion/non-inclusion of search keywords in a predetermined search keyword set. Search keyword length is the number of characters contained in the search keyword or, specifically, the factor parameter value corresponding to different numbers of characters. For example, the preset factor parameter value corresponding to a search keyword of length 2 is 1, the preset factor parameter value corresponding to a search keyword of length 3 is 0.8, the preset factor parameter value corresponding to a search keyword of length 4 is 0.5, and so on. The "number of semantic terms" refers to the following: after the search keyword undergoes word segmentation processing, the quantity of semantic terms obtained thereby is compared to preset threshold values. The semantic term factor parameter value corresponding to the search keyword is determined on the basis of the comparison result. Examples of predetermined search keyword sets are prohibited word sets, product brand word sets, and special commercial intention word sets. The parameter value corresponding to the search keyword is determined for this factor on the basis of whether or not the compared search keywords contain sample words in these predetermined search keyword sets.

When recommending search keywords, the search engine, after receiving search keywords input in the search field by a user, typically performs the following steps with respect to each search keyword contained in the search log:

1. Determine the similarity values between the search keywords contained in the search log and the input search keywords. There are many specific methods whereby the similarity between two search keywords can be determined. For example, a method based on the longest common substring of the two search keywords may be employed. The recommended values for the search keywords contained in the search log can then be determined by using the weighted sum method on the determined similarity values and importance parameter values of the search keywords contained in the search log.

2. In accordance with a high-to-low sequence for the corresponding recommendation values, put the search keywords contained in the search log into sequence, and select the first N search keywords as the search keywords recommended to the user.

The advantage of the search log-based scheme for recommending search keywords described above lies in the ability to guide, in step-by-step fashion, users who have a clearly defined intention to complete or revise the search process. For example, the search keyword input by a user is "mobile phone." The first search keyword recommended according to the above-described search log-based scheme for recommending search keywords is "S brand mobile phone." If the user clicks on the recommended search keyword "S brand mobile phone" to conduct a further search, such an action is the equivalent of the currently input search keyword being "S brand mobile phone." The second search keyword recommended according to the above-described search log-based scheme for recommending search keywords is "S brand smart mobile phone," and so on.

However, in the case of users who do not have an obvious search intention, as for example a user who inputs "distributor franchise" as the search keyword, the recommendation scheme involving continual refinement as described above cannot easily meet the requirements. The recommended search keywords are often on the whole semantically the same as the input search keywords; they are alternatively words formed after adding other determiners to the search keywords. Moreover, the recommended search keywords often are limited to a specific field. The search keyword recommendations are often ineffective for such search terms. That is, recommended search keywords are rarely clicked by the user. In addition, when the search engine server performs keyword-related recommendations, it needs to obtain a search log, perform similarity value calculations, and perform operations such as sequencing. System resources of the search engine server are consequently occupied, and yet the associated keywords that are recommended fail to meet the needs of the user. Therefore, this approach wastes the system resources of search engine servers and diminishes their processing efficiency.

BRIEF DESCRIPTION OF THE DRAWINGS

Various embodiments of the invention are disclosed in the following detailed description and the accompanying drawings.

DETAILED DESCRIPTION

Figure 1A:
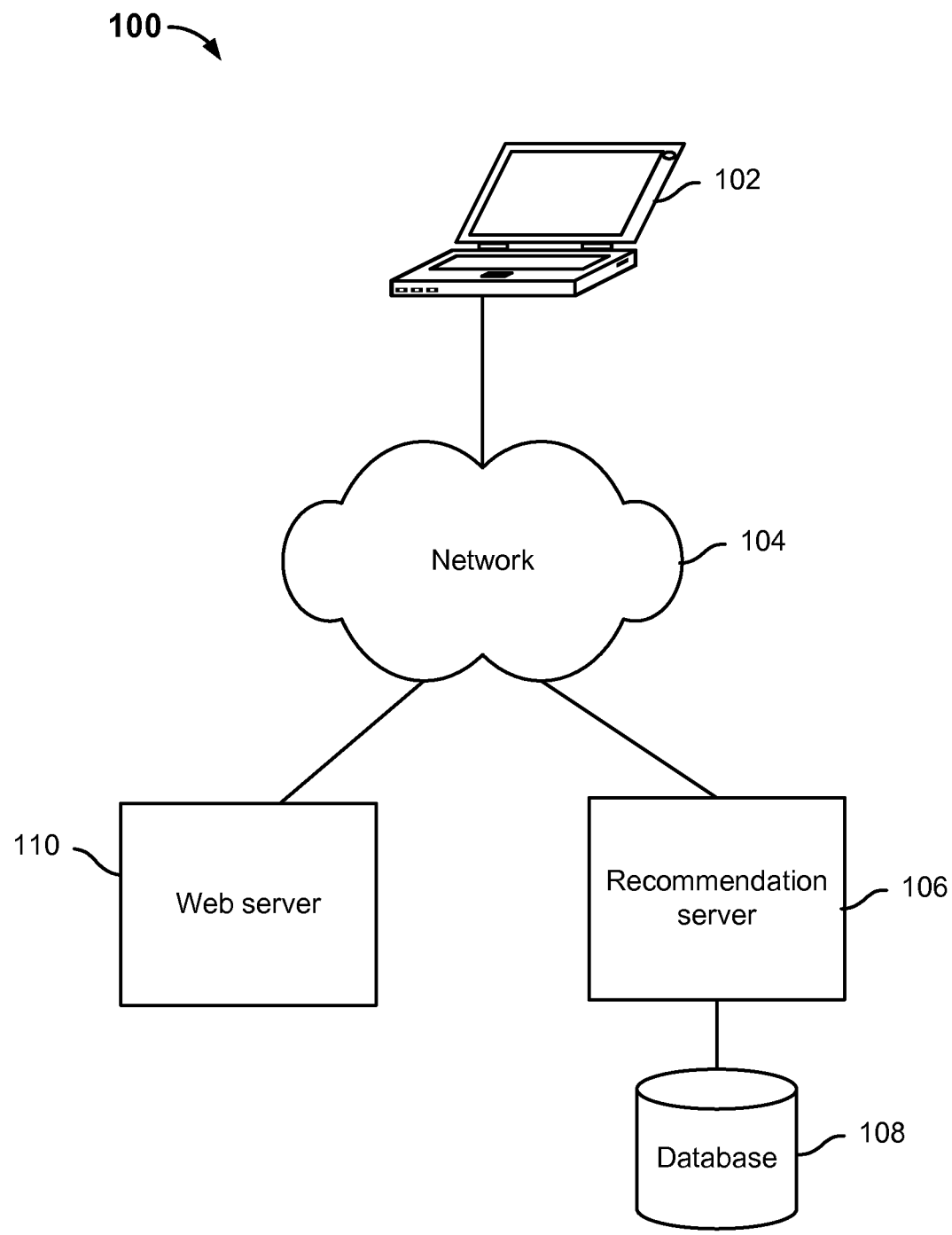
FIG. 1A is a diagram showing an embodiment of a search recommendation platform.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A search keyword recommendation scheme is disclosed to address certain problems of existing search keyword-recommending schemes, namely the poor recommendation results when recommending search keywords to users without clearly defined search intentions and wasted search engine server system resources. In some embodiments, the first step in this scheme is to assess whether search keywords input by users reflect clearly defined search intentions. Search keywords are recommended to users by search keyword recommendation schemes that are differentiated according to whether the search keywords which they input have or do not have clearly defined search intentions.

In addition, embodiments of the present application further offer two methods for recommending search keywords to users who do not have clearly defined search intentions. In some embodiments, to determine recommended search keywords on search keywords that lack an obvious search intention, a first predetermined recommendation method is used as the primary method of determining recommended search keywords, and other recommendation methods are used as auxiliary methods of determining search keywords. Because the first predetermined recommendation method is a knowledge-based system and/or session correlation-based recommendation method suitable for situations in which there is no obvious search intention, it improves search keyword recommendation results and raises the efficiency of search engine servers.

FIG. 1A is a diagram showing an embodiment of a search recommendation platform. System 100 includes client device 102, network 104, recommendation server 106, database 108, and web server 110. In some embodiments, network 104 is implemented using high-speed data networks and/or telecommunications networks. In some embodiments, recommendation server 106 and the web server 110 are configured to work separately but coordinate with each other. In some embodiments, recommendation server 106 and web server 110 are combined into a single device and/or configured to work in combination.

Examples of client device 102 include a laptop computer, a desktop computer, a smart phone, a mobile device, a tablet device or any other computing device. In various embodiments, an application such as a web browser is installed at device 102 to enable communication with web server 110 and/or recommendation server 106.

In this example, the web server (e.g., a search engine) is configured to receive search keywords sent by the user from the client device, send them to the recommendation server, receive additional recommended keywords, and send the additional recommended keywords to the user. In some embodiments, the recommendation server directly communicates with the client device. Recommendation server 106 is configured to recommend additional search keywords in response to a search keyword received from client devices, such as device 102. Database 108 is configured to store defined-intention words and undefined-intention words, which are used by the recommendation server to make search keyword recommendations.

Figure 1B:
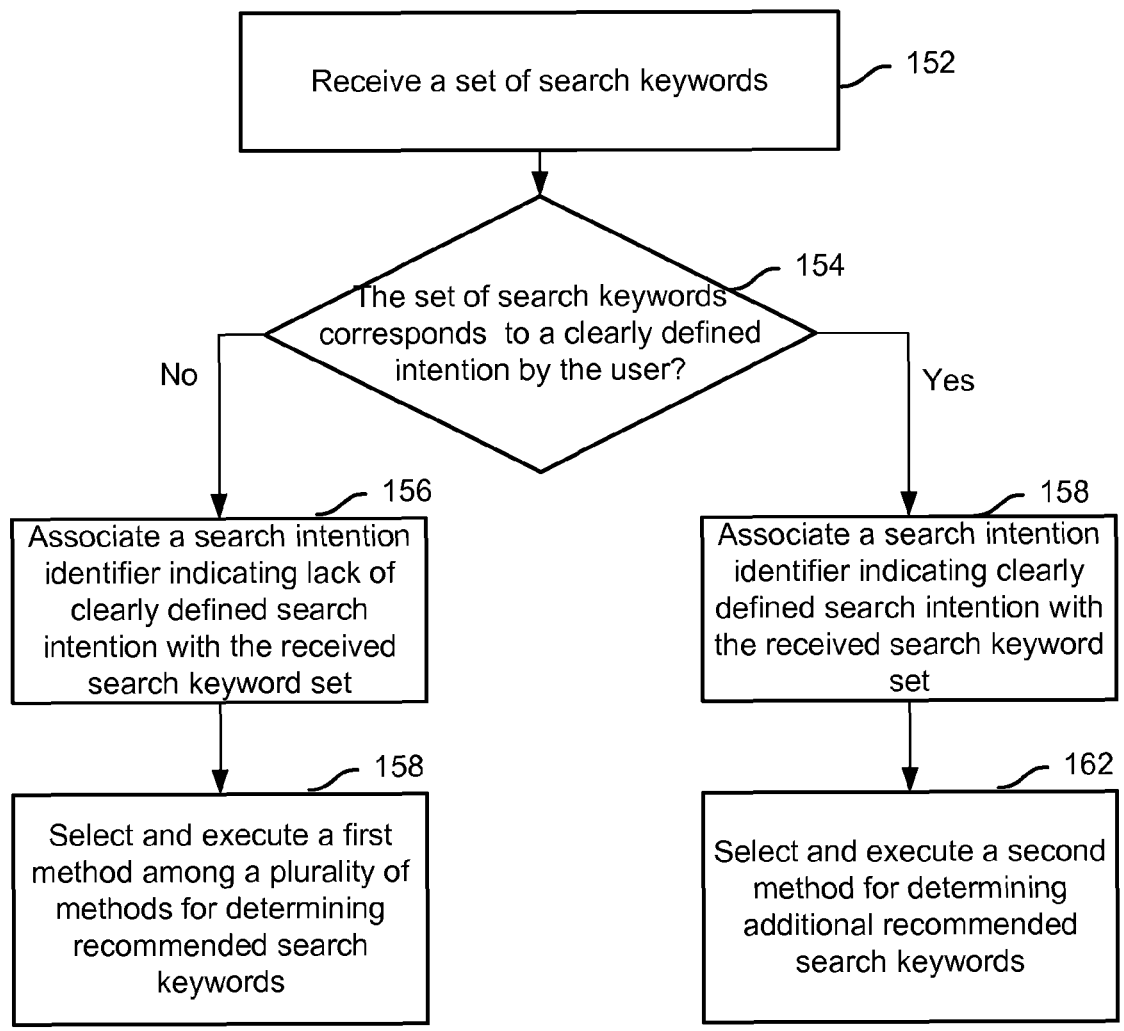
FIG. 1B is a flowchart illustrating an embodiment of a process for making search term recommendations.

FIG. 1B is a flowchart illustrating an embodiment of a process for making search term recommendations. Process 150 may be performed on a system such as 100.

At 152, a set of search keywords (e.g., one or more search keywords input by a user) is received.

At 154, it is determined whether the set of search keywords correspond to a clearly defined intention by the user. In this example, the set of received search keywords is compared with sample words in a preconfigured undefined-intention word set and in a preconfigured defined-intention word set. The sample words in the undefined-intention word set indicate a lack of any specific search intention, and the sample words in the defined-intention word set are words that indicate the presence of some specific search intention. The words in each set may be made by manual classification and/or by machine learning. Generally speaking, undefined-intention sample words are words that represent abstract ideas and do not clearly correspond to any entity or thing. Undefined-intention sample words do not directly include or correspond to product names or brands. For example, "programming," "risk analysis," "legal complaint," etc. are undefined-intention sample words. In contrast, "defined-intention words" are concrete words or phrases that clearly correspond to an entity or thing. The names of real objects and merchandise are defined-intention words. Examples include "mobile phone," "automobile," "fire extinguisher," and so on.

In this example, to determine whether the received search keywords contain sample words in the preconfigured undefined-intention word set (or defined-intention word set), it is determined whether the received search keywords include a substring that is the same as a sample word in the undefined-intention word set (or defined-intention word set). If the received search keyword includes sample words in the undefined-intention word set, but does not include sample words in the defined-intention word set, control is then transferred to 156; otherwise, control is transferred to 158.

At 156, optionally, a search intention identifier (e.g., 0) that indicates the lack of a clearly defined search intention is associated with the received search keyword set. The process proceeds to 160.

At 160, a first method among a plurality of methods for determining recommended search keywords is selected and executed. The selection is based at least in part on whether the received search keywords have a clearly defined search intention. In this example, the first predetermined recommendation method is used as the primary method of determining recommended search keywords. Other recommendation methods can be used optionally as auxiliary methods of determining search keywords. As will be described more fully below, the first predetermined recommendation method can be a knowledge-based system recommendation method and/or a session correlation-based recommendation method. In this example, when the primary method is a knowledge-based system recommendation method, the other recommendation methods, including session correlation-based recommendation methods, can be regarded as recommendation methods that are auxiliary to the knowledge-based system recommendation method. And when the primary method is a session correlation-based recommendation method, the other recommendation methods, including knowledge-based system recommendation methods, can be regarded as recommendation methods that are auxiliary to the session correlation-based recommendation method.

At 158, optionally, a search intention identifier that indicates that the received search keyword set has a clearly defined search intention (e.g., 1) is associated with the received search keyword set. The process proceeds to 162.

At 162, a second predetermined recommendation method is executed to determine additional recommended search keywords. The second predetermined recommendation method can be a search log-based recommendation method, or a combination of a search log-based recommendation method and other auxiliary methods which are other methods for determining search keywords.

In embodiments of the present application, both knowledge-based system and session correlation-based recommendation methods are suitable for recommending search keywords with non-clearly-defined search identifiers and are capable of attaining good recommendation results. The process of recommending search keywords using recommendation methods that are primarily knowledge-based system or session correlation-based recommendation methods will be described in detail in a specific embodiment below. When it is determined that the received search keyword contains sample words in the undefined-intention word set only, the use of either of these two methods as the primary method for recommendation of search keywords can improve search keyword recommendation results and solve a problem of the prior art, namely the poor recommendation results which occur when recommending search keywords to users without clearly defined search intentions and the consequent wastage of search engine server system resources.

In some embodiments, when more than one recommendation method is used to generate recommended keywords, the proportion of search keywords recommended by the first recommendation method is greater than the proportion of search keywords recommended by other recommendation methods.

Figure 2:
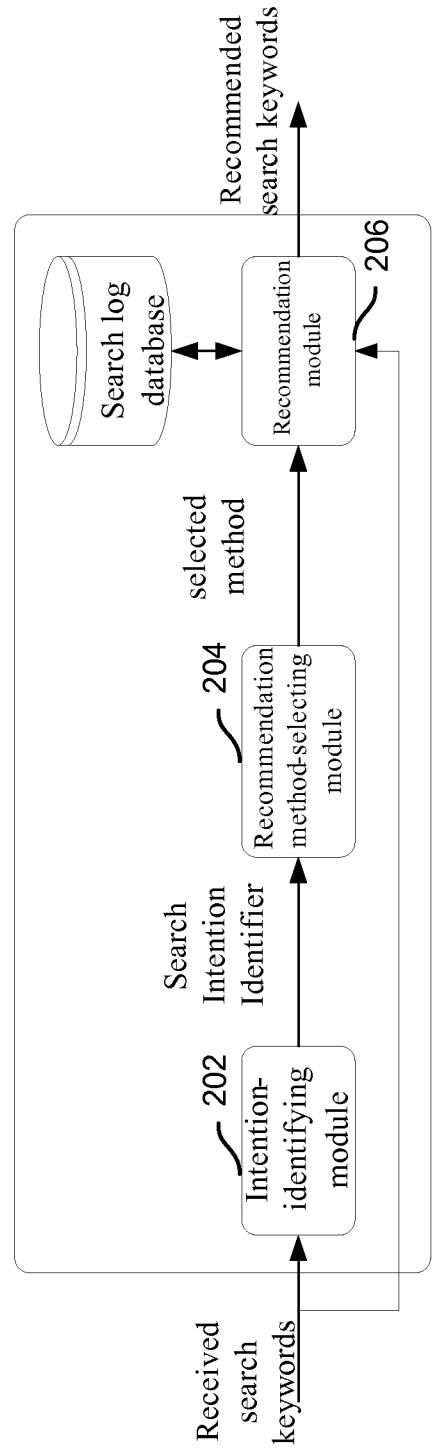
FIG. 2 is a schematic diagram of an embodiment of a search keyword-recommending device.

FIG. 2 is a schematic diagram of an embodiment of a search keyword-recommending device. Device 200 may be used to implement recommendation server 106. In this example, device 200 includes an intention-identifying module 202, a recommendation method-selecting module 204, and a search keyword-recommending module 206.

Intention-identifying module 202 is configured to determine whether the received search keywords indicate a clearly defined intention. In this example, the module checks whether the input search keyword includes sample words in the undefined-intention word set, but does not include sample words in the defined-intention word set. If so, the received search keywords do not indicate a clearly defined intention, and the search identifier corresponding to the input search keyword is a non-clearly-defined intention search intention identifier; otherwise, the received search keywords have a clearly defined intention and the search identifier corresponding to the input search keyword is a clearly-defined search intention identifier. The intention-identifying module sends the search intention identifier of the input search keyword to the recommendation method-selecting module for processing.

Recommendation method-selecting module 204 is configured to select, according to preset correspondences between recommendation strategies and different search intention identifiers, the most appropriate recommendation strategy corresponding to the search intention identifier sent from the intention-identifying module.

Search keyword-recommending module 206 is configured to determine, based on the search keyword input by the user and the recommendation strategy recommended by the recommendation method-selecting module, the recommended search keywords.

Figure 3A:
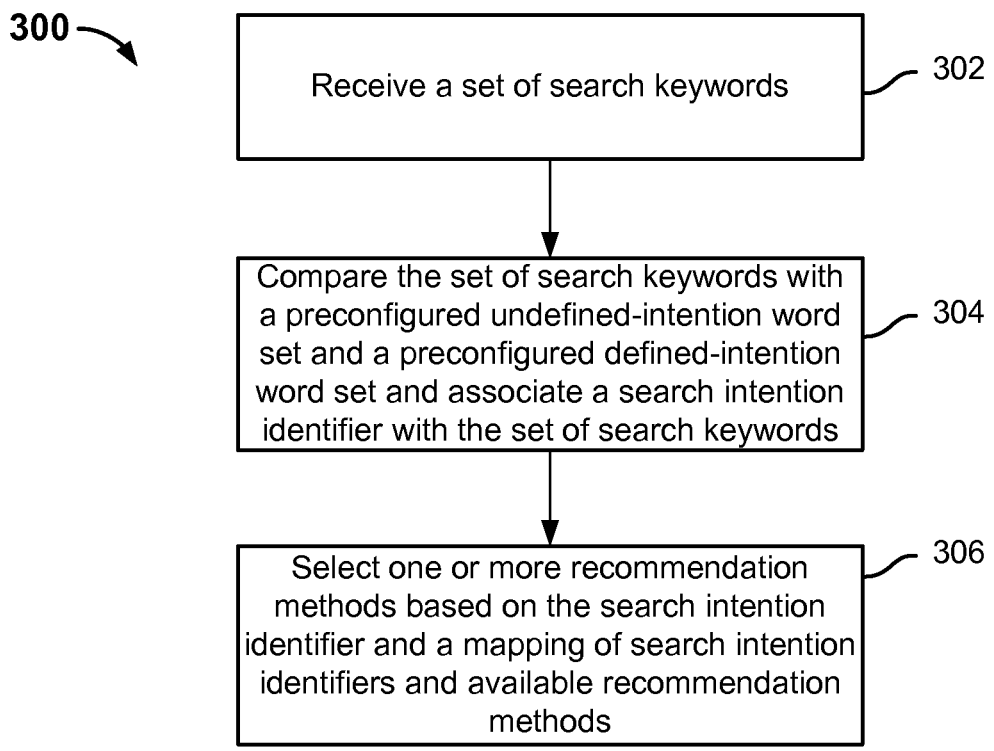
FIG. 3A is a flowchart illustrating an embodiment of a search keyword-recommendation process.

FIG. 3A is a flowchart illustrating an embodiment of a search keyword-recommendation process. Process 300 may be executed on a system such as 106 or 200.

At 302, a set of search keywords is received. For example, the search keywords can correspond to inputs by a user in the search field of a search engine web page, such as "distributor franchise."

At 304, the set of search keywords are compared with preconfigured undefined-intention and defined-intention word sets, and a search intention identifier is associated with the set of search keywords.

When the input search keyword includes sample words in the undefined-intention word set but does not include sample words in the defined-intention word set, the search identifier corresponding to the input search keyword is set to a value indicating that the user's search intention is not clearly defined (referred to as the non-clearly-defined search intention identifier). Otherwise, the search identifier is set to a value indicating that the user's search intention is clearly-defined (referred to as the clearly-defined search intention identifier). In various embodiments, the non-clearly-defined search intention identifier and the clearly-defined search intention identifier can correspond to various predetermined values, e.g., "NEG" as the non-clearly-defined search intention identifier and "POS" as the clearly-defined search intention identifier; or "0" as the non-clearly-defined search intention identifier and "1" as the clearly-defined search intention identifier.

At 306, based on the search intention identifier and a mapping of different search intention identifiers to recommendation methods, one or more recommendation methods are selected among a plurality of available recommendation methods.

An example mapping table of different search intention identifiers and recommendation strategies and different search intention identifiers is shown in Table 1. In the table, recommendation method A is a knowledge-based system (KBS) recommendation method, recommendation method B is a session correlation-based recommendation method, and recommendation method C is a search log-based recommendation method.

TABLE 1

| Search intention identifier | Recommendation strategy |
| --- | --- |
| Clearly-defined search intention identifier | Recommendation method C (search log) |
| Non-clearly-defined search intention identifier | Recommendation method A (KBS) or Recommendation method B (session correlation) |

In some embodiments, the recommendation strategy corresponding to each different search intention identifier is a combination of recommendation methods. For example, the recommendation strategy corresponding to the non-clearly-defined search intention identifier can be one in which a first predetermined recommendation method is used as the primary method of determining recommended search keywords and other recommendation methods are used as auxiliary methods of determining search keywords; the recommendation strategy corresponding to the clearly-defined search intention identifier can be one in which a search log-based recommendation method is used as the primary method of determining recommended search keywords and other recommendation methods are used as auxiliary methods of determining search keywords. In some embodiments, this primary-auxiliary relationship is embodied in the proportion of the quantity of search keywords recommended by each type of recommendation method within the total quantity of recommended keywords, as shown in Table 2.

TABLE 2

| Search intention identifier | Recommendation strategy |
| --- | --- |
| Clearly-defined search intention identifier | 70% recommendation method C + 30% recommendation method A; or 70% recommendation method C + 30% recommendation method B; or 60% recommendation method C + 20% recommendation method A + 20% recommendation method B; . . . |
| Non-clearly-defined search intention identifier | 70% recommendation method A + 30% recommendation method C; 70% recommendation method B + 30% recommendation method C; 40% recommendation method A + 40% recommendation method B + 20% recommendation method C; . . . |

Assume that: the proportion of search keywords recommended by recommendation method A within all the recommended search keywords is a; the proportion of search keywords recommended by recommendation method B within all the recommended search keywords is b; the proportion of search keywords recommended by recommendation method C within all the recommended search keywords is c. With regard to the recommendation strategy corresponding to the clearly-defined search intention identifier, $c>=a+b$. With regard to the recommendation strategy corresponding to the non-clearly-defined search intention identifier, $a+b>=c$. For purposes of discussion, the proportions a, b and c are sometimes referred to as "recommendation proportions."

At 308, the selected recommendation methods are applied to the set of search keywords input by the user, and the recommended search keywords are determined.

Referring again to table 2, the specific values of a, b and c can be dynamically adjusted through a self-adaptive method. For example, an exposure-feedback rate-based (CTR, Click-Through-Rate) method may be used for dynamic adjustment of the values of a, b and c. Search keywords, either those input by a user or those that are recommended which are searched to obtain search results, are said to have undergone an exposure. If the user clicks the search results, then the search keyword is said to have experienced a feedback. As for recommendation methods, if the current search results were obtained by searching with a search keyword recommended by recommendation method A, then recommendation method A is said to have obtained 1 exposure. If the search results currently clicked by the user were obtained from a search keyword recommended by recommendation method A (the knowledge-based system recommendation method), then recommendation method A is said to have received 1 feedback.

The "exposure to feedback rate" of a recommendation method is the ratio between the number of exposures obtained by this recommendation method and the number of feedbacks obtained on the basis of this number of exposures. For example, the exposure-feedback rate of recommendation method A is the ratio of the number of times that recommendation A is exposed during a predetermined time segment to the number of feedbacks obtained with recommendation method A.

Figure 3B:
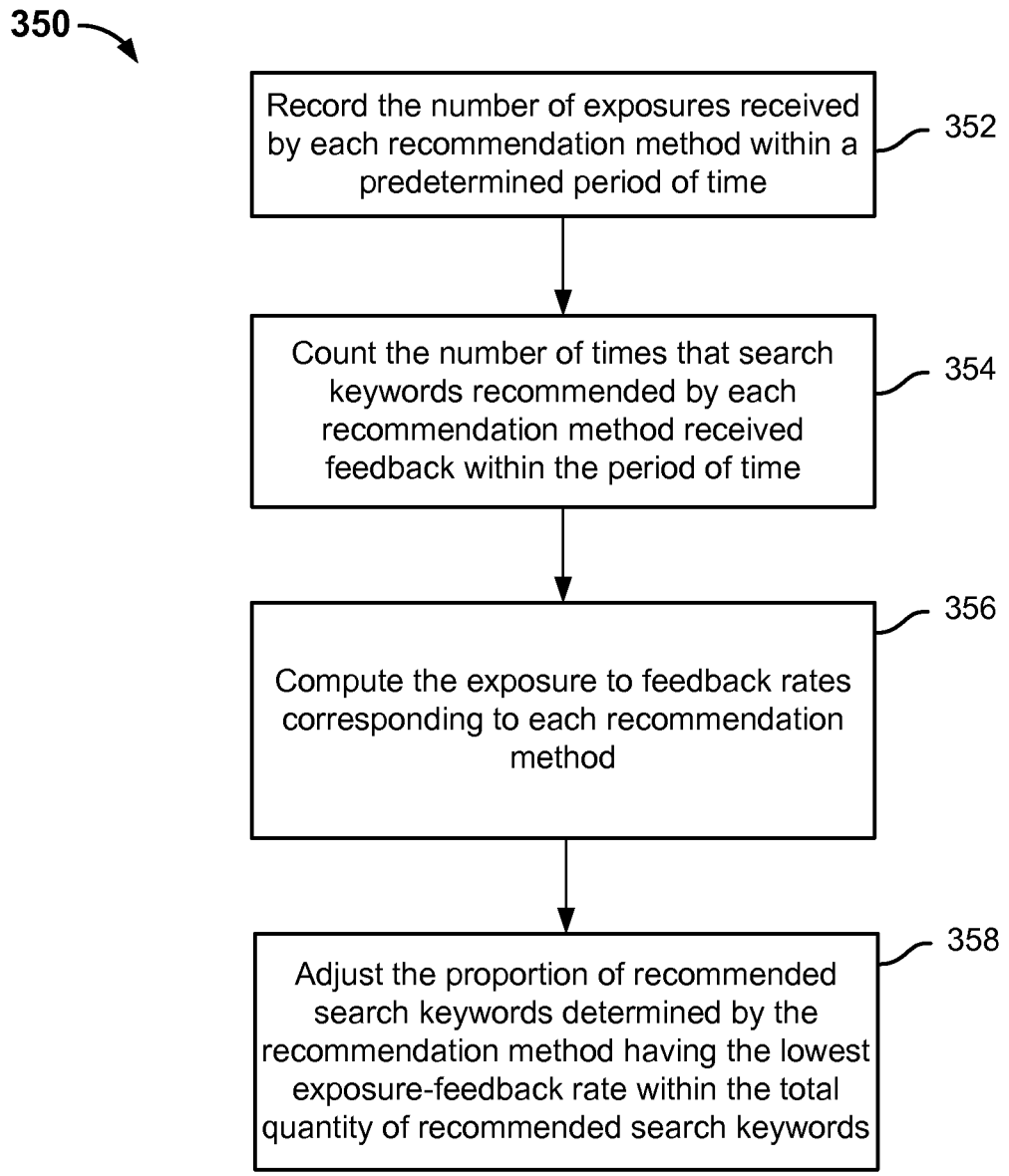
FIG. 3B is a flowchart illustrating an embodiment of a process for adjusting the recommendation proportions a, b and c.

FIG. 3B is a flowchart illustrating an embodiment of a process for adjusting the recommendation proportions a, b and c. Process 350 may be performed on a system such as 106 or 200.

At 352, each time that a user clicks on search results within a predetermined period of time, the recommendation method used for the current search keywords is recorded. In other words, the number of exposures received by each recommendation method within a predetermined period of time is recorded.

At 354, the number of times that search keywords recommended by each recommendation method received feedback within the period of time is counted.

At 356, the exposure to feedback rates corresponding to each recommendation method is calculated based on the number of exposures received and the number of feedbacks received.

At 358, according to a preset adjustment increment, the search engine increases the proportion of the quantity of recommended search keywords determined by the recommendation method having the lowest exposure to feedback rate (which can be understood as the recommendation which achieves a higher feedback efficiency) within the total quantity of recommended search keywords as determined by all recommendation methods, and decreases this ratio where it corresponds to the recommendation method having the highest exposure to feedback rate (which can be understood as the recommendation method which achieves a lower feedback efficiency).

As an example, it is assumed that in step 352, within a 5-day period, recommendation method A receives 1,000 exposures, recommendation method B receives 500 exposures, and recommendation method C receives 300 exposures.

Also assume that in step 354, within a 5-day period, recommendation method A receives 500 feedbacks, recommendation method B receives 200 feedbacks, and recommendation method C receives 100 feedbacks.

In step 356, the exposure-feedback rate corresponding to recommendation method B is 500 exposures/200 feedbacks=2.5.

The exposure-feedback rate corresponding to recommendation method C is 300 exposures/100 feedbacks=3.

The exposure-feedback rate corresponding to recommendation method A is 1,000 exposures/500 feedbacks=2.

Assume that prior to adjustment, a=40%, b=40%, and c=20%. In step 358, since recommendation method A has the lowest exposure-feedback rate, and recommendation method C has the highest exposure-feedback rate, the values a and c are modified. Assume that a 5% adjustment increment is preset, the new values are computed as follows: a'=a+5%=45%; c'=c−5%=15%.

Detailed descriptions are given below of the knowledge-based recommendation method and the session correlation-based recommendation method.

Knowledge-Based Recommendation Method

Figure 4:
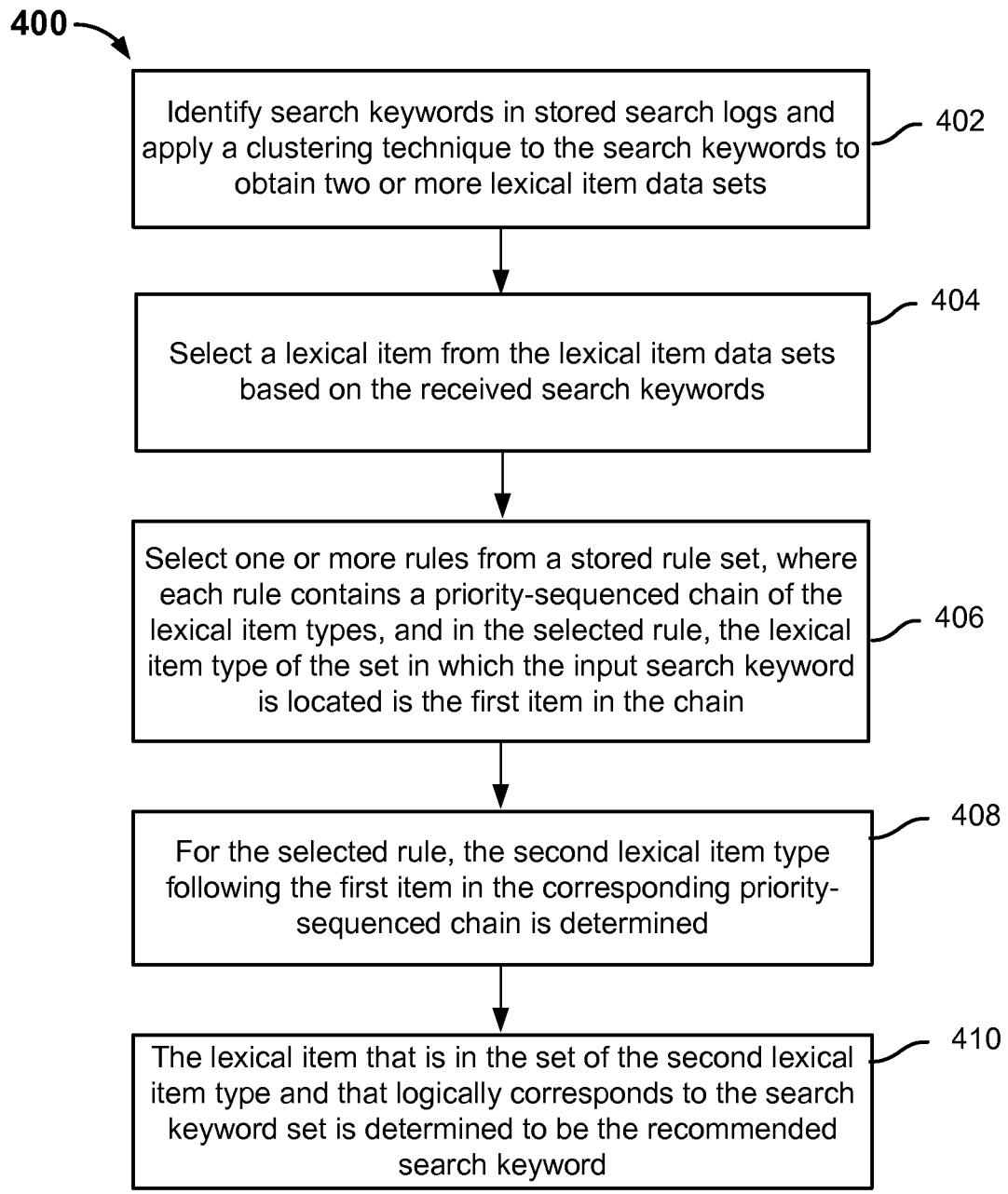
FIG. 4 is a schematic diagram of an embodiment of a knowledge-based recommendation method.

FIG. 4 is a schematic diagram of an embodiment of a knowledge-based recommendation method. Process 400 may be performed by a system such as 106 or 200.

At 402, a database storing search logs is mined for search keyword data, and a clustering technique is applied to the search keywords to obtain two or more lexical item sets. All the lexical items in the same lexical item set have logical correspondences and have the same lexical item type, and the lexical item types corresponding to different lexical item sets differ.

In this example, the following four different types of lexical item sets are obtained: a compound-type lexical item set where each lexical term includes multiple words, a mono-type lexical item set where each lexical term includes a single word, a brand-type lexical item set where each lexical item corresponds to a brand, and a product model-type lexical item set where each lexical item corresponds to a product model. The brand-type and the product model-type lexical item sets are more specific than the compound-type and the mono-type lexical item sets. In this case, if a lexical item can belong to multiple lexical item sets, it is associated with the more specific lexical item set (e.g., "tv9829" can be a mono-type lexical item or a product model-type lexical item, and it is associated with the product model-type).

Figure 5:
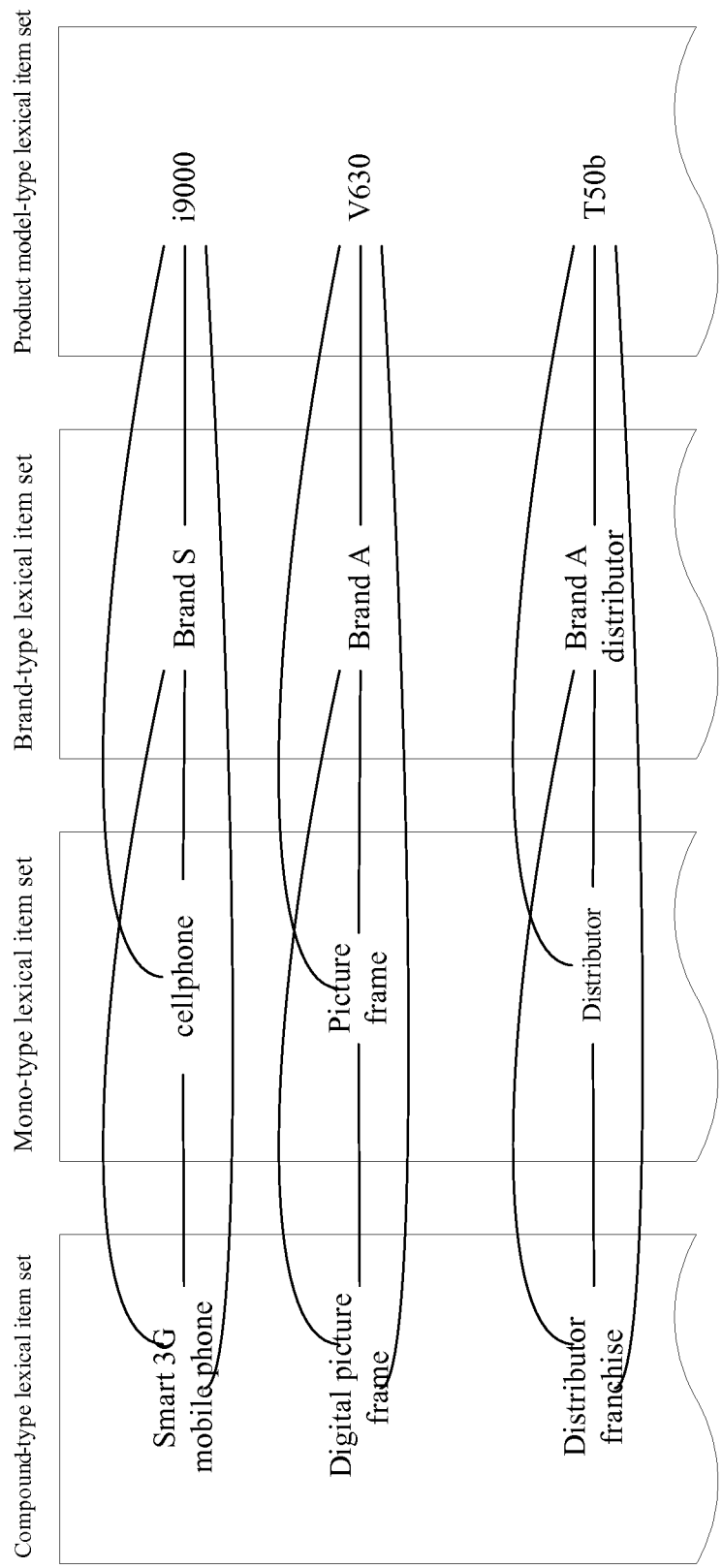
FIG. 5 is a diagram illustrating several example lexical item sets.

FIG. 5 is a diagram illustrating several example lexical item sets. In this example, the lexical item "smart 3G mobile phone" in the compound-type lexical item set, the lexical item "cellphone" in the mono-type lexical item set, the lexical item "brand S" in the brand-type lexical item set, and the lexical item "i9000" in the product model-type lexical item set logically correspond to each other because they all relate to mobile phones.

The lexical item "digital picture frame" in the compound lexical item set logically relates to "picture frame" in the mono-type lexical item set while also corresponding logically to the lexical item "brand A" in the brand-type lexical item set and the lexical item "v630" in the product model-type lexical item set because they all have to do with photo frames.

The lexical item "distributor franchise" in the compound lexical item set logically relates to "distributor" in the mono-type lexical item set while also corresponding logically to the lexical item "brand A distributor" in the brand-type lexical item set and the lexical item "T50b" in the product model-type lexical item set, and so on.

Returning to FIG. 4, at 404, based on the received search keywords, a lexical item set is selected from the lexical item sets obtained from step 402. The selected lexical item set includes the lexical items that best match the set of search keywords.

In this example, the set of search keywords input by the user is compared with the lexical items in the four lexical item sets described above to determine the set in which the set of search keywords is located. For example, if the set of search keywords is "franchise distributor", then the set in which the search keyword input by the user is located is the compound-type lexical item set.

At 406, one or more specific rules are selected from a stored rule set, where each rule in the rule set includes a priority-sequenced chain of the lexical item types. In the selected rule, the lexical item type of the set in which the input search keyword is located is the first item in the chain. For example, the following rules may be stored:

Rule 1: compound-type > brand-type > product model-type;
Rule 2: mono-type -> compound-type > brand-type > product model-type;
Rule 3: product model-type > brand-type;
Rule 4: brand-type > product model-type;
...

Using the search keyword set "franchise distributor" as an example, the set corresponding to "franchise distributor" is the set containing compound-type lexical items. Therefore, for the search keyword "franchise distributor," the selected rule is rule 1 in which compound-type is the first item in the chain.

At 408, for each selected rule, the second lexical item type following the first item in the corresponding priority-sequenced chain is determined.

In rule 1, the lexical item type after the first item in the chain "compound-type" is "brand-type."

At 410, the lexical item that is in the set of the second lexical item type and that logically corresponds to the received search keyword set is determined to be the recommended search keyword.

Referring again to FIG. 5, because the lexical item in the brand-type lexical item set that logically relates to "distributor franchise" in the compound-type lexical item set is "brand A distributor," the lexical item "brand A distributor" is selected to serve as the recommended search keyword.

The number of rules selected in step 406 is at least one. Therefore, at least one corresponding search keyword is recommended in step 410. When the number m of search keywords recommended using the knowledge-based system recommendation method exceeds a*n (n is the total number of recommended search keywords), the number of search keywords recommended using the knowledge-based system recommendation method as needed by the search strategy (i.e., when m>a*n), a*n search keywords are selected from the m search keywords recommended by the knowledge-based system recommendation method. The specific preferred method includes selection based on the importance parameter values of the search keywords.

Session Correlation-Based Recommendation Method

Figure 6:
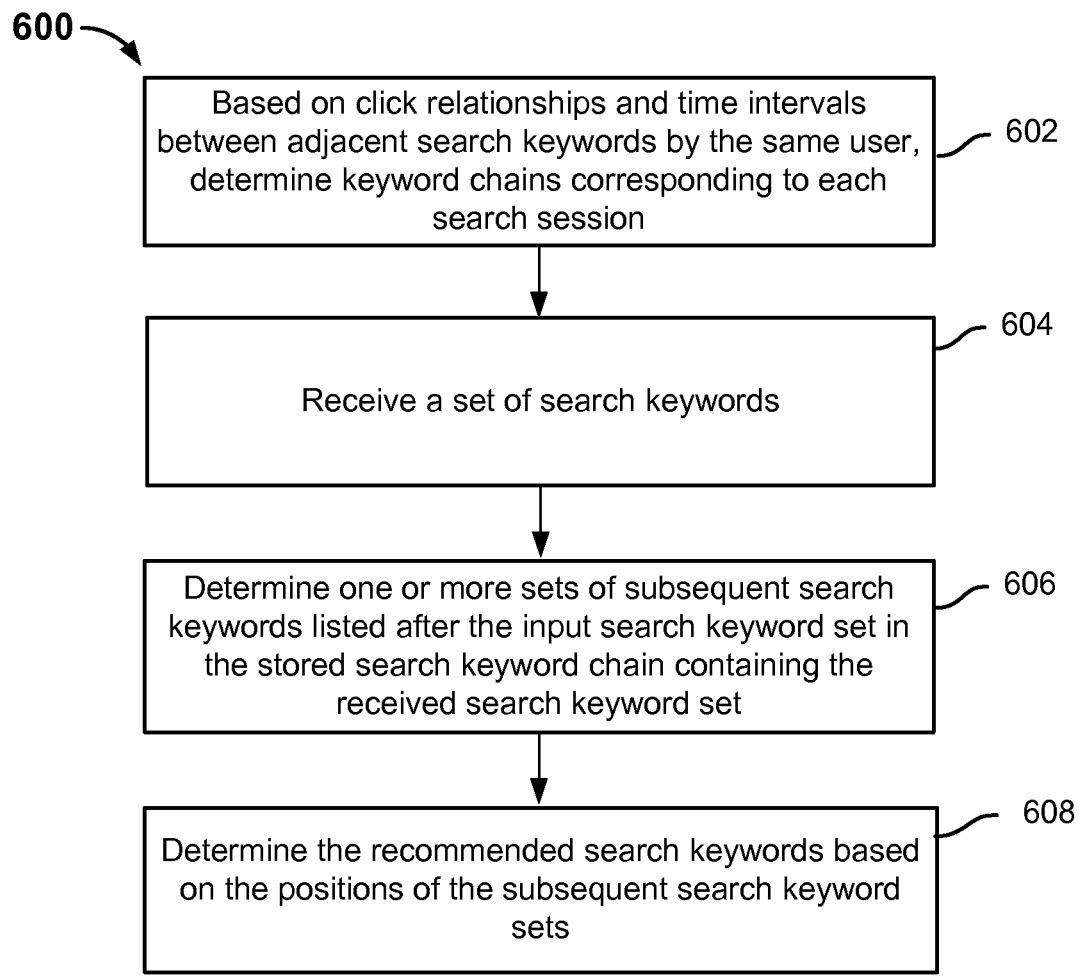
FIG. 6 is a flowchart illustrating an embodiment of a session correlation-based recommendation method.

FIG. 6 is a flowchart illustrating an embodiment of a session correlation-based recommendation method.

At 602, based on click relationships and time intervals between adjacent search keywords used by the same user in a search log, search keyword chains corresponding to each search session are determined and stored, where each of the search keyword chains comprises at least two search keywords. As used herein, adjacent search keywords are different search keywords whose input times are separated by a time interval smaller than a preset threshold value. A search log generally stores the search records of a single user. The search records include the times of the web page searched conducted on the basis of input search keywords and such information as whether or not search results were clicked.

A "click relationship between two adjacent keywords" means that the same user conducted separate web searches on the basis of each of these two search keywords within a set period of time, such as five minutes, and that the user clicked web page links in the search results obtained on the basis of each of these two search keywords. The fact that a user clicked web page links in the search results indicates that the user had a relatively satisfactory search session using these search keywords. As for the adjacent keywords, the search keyword set that comes after the input time can be a search keyword set selected from among search keyword sets recommended on the basis of a previously input search keyword, or it can be another search keyword input by the user.

Through the methods described above, it is possible to obtain search keyword chains that contain at least two search keywords and correspond to a search session.

In this example, among other keyword chains, the following search keyword chains are obtained:

---

Search keyword chain 1: "Distributor-distributor franchise-brand A franchisee-brand A model T50b product";
Search keyword chain 2: "Distributor franchise-apparel boutique franchise-franchise hotline";
Search keyword chain 3: "Brand K fast food restaurant-distributor franchise-franchise hotline"
...

---

At 604, a set of search keywords is received.

In this example, the search keyword that the user inputs into the search field is "distributor franchise."

At 606, one or more sets of search keywords listed after the input search keyword set in the stored search keyword chain containing the received search keyword set are identified.

The search keyword sets listed after "distributor franchise" in search keyword chain 1 are "brand A franchisee" and "brand A model T50b product." The search keyword sets listed after "distributor franchise" in search keyword chain 2 are "apparel boutique franchise" and "franchise hotline." The search keyword set listed after "distributor franchise" in search keyword chain 3 is "franchise hotline."

At 608, the recommended search keyword sets are determined based on the positions of the search keyword sets determined in step 606. A variety of techniques can be used to make the determination, including:

1. Based on pre-stored sets having lexical items of various categories of industries (e.g., an apparel product-type lexical item set, an electronic product-type lexical item set, etc.), select from the search keyword sets listed after the input search keywords in the search keyword chains a set of search keywords whose category of industry is the same as that of the input search keyword, and regard these as the recommended search keywords.

2. Calculate the probabilities of different later-listed search keyword sets occurring among all later-listed search keyword sets, and based on the probabilities successively select search keyword sets that are most likely to occur, until a predetermined quantity of recommended search keywords is reached.

For example, assume that: there are a total of 100 search keyword chains in which "distributor franchise" appears; in 50 of these search keyword chains, "franchise hotline" is listed after "distributor franchise"; in 15 of these search keyword chains, "apparel boutique" is listed after "distributor franchise;" in 15 of these search keyword chains "franchisee training" is listed after "distributor franchise"; and in 20 of these search keyword chains "franchise share of profit" is listed after "distributor franchise." Accordingly, the probability that "franchise hotline" will occur is 0.5, the probability that "franchise share of profit" will occur is 0.2, the probability that "apparel boutique" will occur is 0.15, and the probability that "franchisee training" will occur is 0.15. Therefore, the recommended sequence after being arranged in the order of high-to-low probabilities is "franchise hotline"—"franchise share of profit"—"apparel boutique"— "franchisee training" If one search keyword needs to be recommended, then "franchise hotline" will serve as the recommended search keyword.

In some embodiments, both of the above-described techniques can be used in combination. For example, first, the later listed search keywords are filtered to select the later listed search keywords that belong to the same category of the industry lexical item set as the input search keyword. Then, from the search keywords that were identified by filtering, further select the search keyword having the highest occurrence probability as the recommended search keyword.

In the search keyword-recommending scheme offered by embodiments of the present application, search intention identification is first performed on the search keywords input by the user in order to identify whether the search keywords have an obvious search intention. With regard to user-input search keywords that lack an obvious search intention, a first predetermined recommendation method is used as the primary method of determining recommended search keywords and other recommendation methods are used as auxiliary methods of determining search keywords. Because the first predetermined recommendation method is a knowledge-based system or session correlation-based recommendation method, it can accomplish better search keyword recommendations for search keywords input by a user without an obvious search intention. It expands the industrial fields used when recommending search keywords and avoids the problem of increasing narrowness which is associated with current log-based keyword recommendation methods. Thus, it can improve search keyword recommendation results. The knowledge-based system recommendation method or the session correlation-based recommendation method can reasonably supplement current log-based recommendation methods when dealing with search keywords input by users lacking obvious search intentions.

In some embodiments, the intention identification-based search keyword recommendation scheme described above can also be combined with category of industry identification of search keywords to obtain even better recommendation results. "Category of industry identification" refers to classifying search log search keywords in advance according to categories of industry (e.g., dividing searches into categories such as electronics, agricultural products, apparel products, etc.) and storing search keyword sets corresponding to each category of industry. When search keyword sets corresponding to at least two categories of industry contain a search keyword set input by users, then the probabilities of the input search keyword set belonging to each category is determined. The probabilities are determined according to the click factor parameter value of the search keyword set corresponding to each category of industry. In addition, based on the determined probabilities and the total number of recommended search keywords, the number of search keywords that need to be recommended for each corresponding category of industry is also determined. For each category of industry, the recommendation strategy determined in 304 of process 300 described above can be used.

Figure 7:
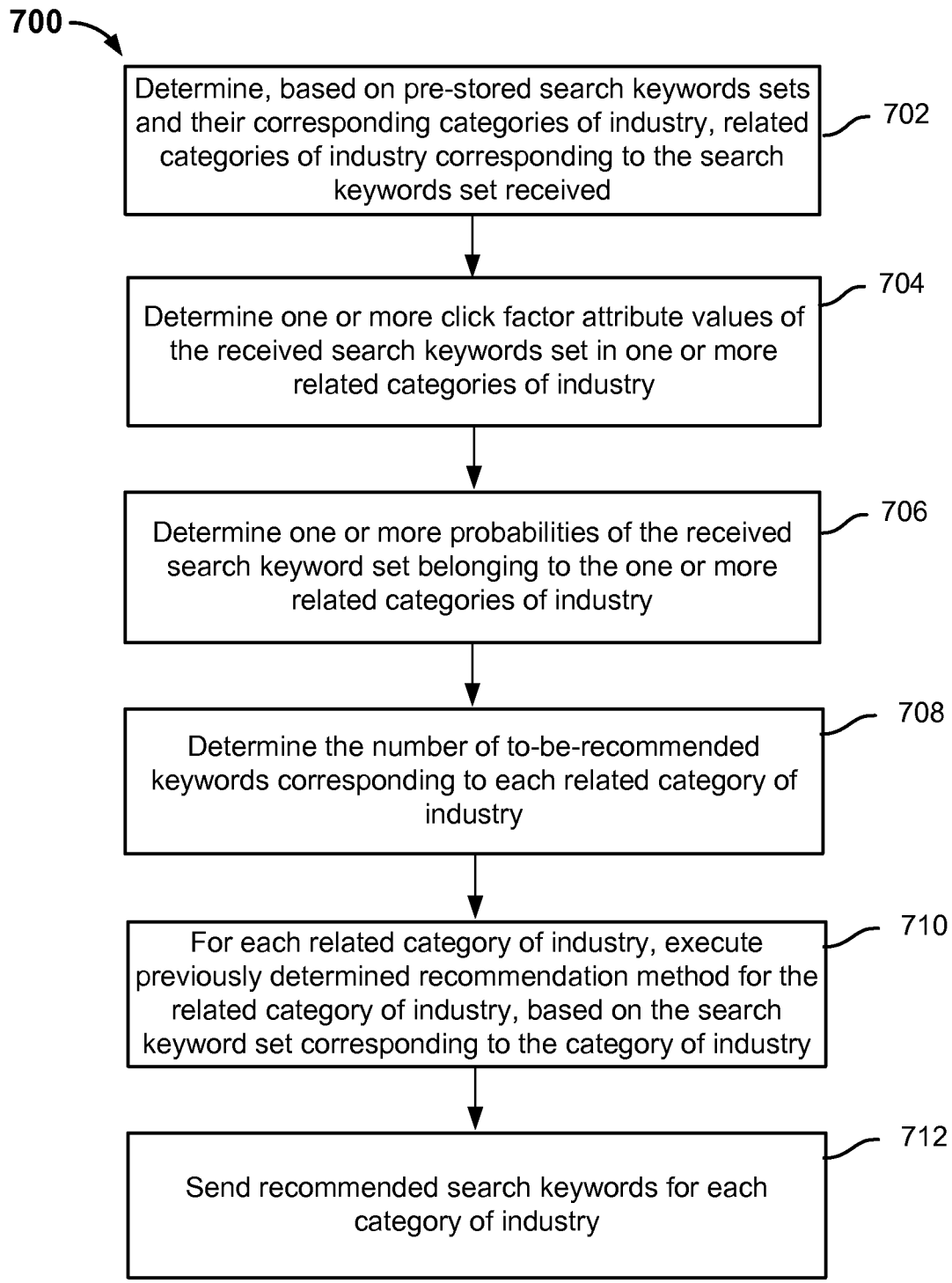
FIG. 7 is a flowchart illustrating an embodiment of a process for recommending search keywords.

FIG. 7 is a flowchart illustrating an embodiment of a process for recommending search keywords. Steps 302-306 of process 300 and steps 702-706 of process 700 may be executed in parallel.

At 702, it is determined, based on pre-stored search keyword sets and their corresponding categories of industry, related categories of industry corresponding to the search keywords set received.

Take the input search keyword "apple" as an example. The search keyword set corresponding to the apparel category of industry and the search keyword set corresponding to the agricultural product category both contain the input search keyword "apple." Thus, the categories of industry set S corresponding to "apple" are {apparel category of industry, agricultural product category}.

At 704, for each related category of industry, the click factor attribute value of the received search keyword set is determined.

For example, in the simplest situation, the click factor attribute value of the search keyword in the search keyword set corresponding to each category of industry is the number of clicks for search results obtained in response to the search keyword. For example, if the number of clicks for search results for the search keyword "apple" in the search keyword set corresponding to the apparel category of industry is 20, then the corresponding click factor attribute value is 20. If the number of clicks for search results for the search keyword "apple" in the search keyword set corresponding to the agricultural product category is 80, then the corresponding click factor attribute value is 80.

At 706, based at least in part on the determined click factor attribute values, the probabilities of the received search keyword set belonging to the related categories of industry are calculated.

In some embodiments, the click factor attribute values of the input search keywords in the determined categories of industry are normalized. The normalization results are regarded as the probabilities of the input search keywords belonging to the determined categories of industry. That is, the probability that the search keyword "apple" belongs to the agricultural product category is 80%, and the probability that it belongs to the apparel category of industry is 20%.

At 708, based at least in part on the probabilities and the number of keywords that need to be recommended, the number of recommended keywords corresponding to each related category of industry is computed.

If the total number of search keywords that need to be recommended is 10, then the number of to-be-recommended keywords corresponding to the agricultural product category is 10×80%=8, and the number of to-be-recommended keywords corresponding to the apparel category of industry is 10×20%=2.

At 710, for each related category of industry, the previously determined recommendation method (for example, previously determined in step 306) is executed, based on the search keyword set corresponding to the category of industry, to determine the recommended search keywords for the related category of industry.

At 712, the search keywords recommended for each category of industry are sent to the requester (e.g. the user). Preferably, the recommended search keywords are sequenced according to the probabilities determined in step 706. For example, the search keywords recommended for a category of industry with a higher probability value are listed and displayed earlier than search keywords recommended for a category of industry with a lower probability value.

Figure 8:
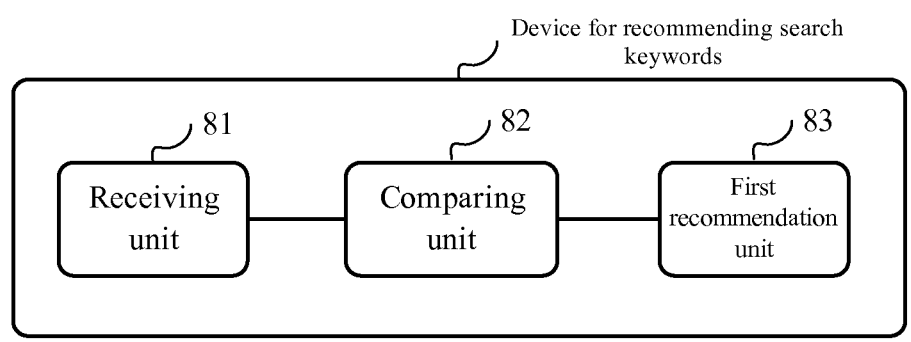
FIG. 8 is a block diagram illustrating an embodiment of a device for recommending search keywords.

FIG. 8 is a block diagram illustrating an embodiment of a device for recommending search keywords. In this example, device 800 includes: a receiving unit 81, for receiving input search keywords; a comparing unit 82, for comparing search keywords received by the receiving unit 81 with sample words in a preset undefined-intention word set and sample words in a preset defined-intention word set; a first recommending unit 83, for selecting one or more recommendation methods from a plurality of recommendation methods and performing the selected recommendation methods. If the received search keywords include sample words in the undefined-intention word set, but do not include sample words in the defined-intention word set, a first recommendation method (which can be a knowledge-based recommendation method and/or a session correlation-based recommendation method) is selected as the primary method of determining recommended search keywords, and other recommendation methods are used as auxiliary methods of determining search keywords.

If the comparison result obtained by the comparing unit 82 is that the received search keywords do not include sample words in the undefined-intention word set, a second predetermined recommendation method is used as the primary method of determining recommended search keywords and recommendation methods other than the second predetermined recommendation method are used as auxiliary methods of determining search keywords.

In some embodiments, the above-described first recommending unit 83 includes: a set-determining module for determining the lexical item set in which the lexical items contained in the search keywords received by the receiving unit 81 are found, wherein the lexical items included in the same lexical item set have logical correspondences and each lexical item type is the same, but the lexical item types corresponding to different lexical item sets differ; a rule-selecting module for selecting, from stored multiple rules containing priority-sequenced chains of various lexical item types, the rule containing the priority-sequenced chain wherein the lexical item type of the lexical items contained in the set determined by the set-determining module is the first item in the chain; a choosing module for executing, with respect to each rule selected by the rule-selecting module, the following: determining the type of the lexical item following the first item in the chain of the priority-sequenced chain contained in said rule, and, in accordance with said logical correspondence, choosing, from the set corresponding to the determined lexical item type, the lexical item logically corresponding to the lexical item contained in the received search keywords as the determined recommended search keyword.

When the first predetermined recommendation method is a session correlation-based recommendation method, the first recommending unit 83 specifically can be divided into the functional modules below: a first determining module, for determining, from pre-stored search keyword chains corresponding to each search process, the search keyword located to the rear of the search keywords received by the receiving unit, wherein the search keyword chains are determined on the basis of click relationships and time intervals between adjacent search keywords used by the same user in a search log, and any search keyword chain contains at least two search keywords; a second determining module for determining, based on the search keywords determined by the first determining module, recommended search keywords.

The units and modules described above can be implemented as software components executing on one or more general purpose processors, as hardware such as programmable logic devices and/or Application Specific Integrated Circuits designed to perform certain functions or a combination thereof. In some embodiments, the units and modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units and modules may be implemented on a single device or distributed across multiple devices. The functions of the units and modules may be merged into one another or further split into multiple sub-units/sub-modules.

A person having ordinary skill in the art could understand that all or some of the steps involved in realizing the embodiments described above could be completed by having a program instruct the appropriate hardware. This program could be stored on readable storage media, such as: ROM/RAM, magnetic disks, optical disks, etc.

Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
receiving a set of search keywords input by a user;
determining whether the set of search keywords indicate a clearly defined intention by the user, including comparing the set of search keywords with a plurality of predetermined words corresponding to intentions that are not clearly defined;
in the event that the set of search keywords are determined not to indicate a clearly defined intention, executing a first recommendation method to obtain recommended search keywords; wherein:
the first recommendation method is selected among a plurality of recommendation methods;
recording a first exposure to feedback rate of a knowledge-based recommendation method and a second exposure to feedback rate of a session correlation-based recommendation method; and
adjusting the first proportion of recommended keywords contributed by the knowledge-based recommendation method for future received search keyword sets, and the second proportion of recommended keywords contributed by the session correlation-based recommendation method for future received search keyword sets,
wherein:
the first recommendation method includes a combination of at least the knowledge-based recommendation method and the session correlation-based recommendation method; and
the knowledge-based recommendation method contributes to a first proportion of recommended keywords and the session correlation-based recommendation method contributes to a second proportion of recommended keywords.

2. The method of claim 1, in the event that the set of search keywords are determined to indicate a clearly defined intention, further comprising executing a second recommendation method to obtain additional recommended search keywords.

3. The method of claim 2, wherein the second recommendation method includes a search log-based recommendation method.

4. The method of claim 1, wherein the session correlation-based recommendation method comprises:
storing search keyword chains corresponding to search sessions by users;
identifying a plurality of search keyword sets listed after the received search keyword set in the stored search keyword chain comprising the received search keyword set; and
determining the recommended search keywords based on positions of the plurality of search keyword sets.

5. The method of claim 4, wherein determining the recommended search keywords includes:
based on pre-stored sets having lexical items of various categories of industries, selecting from the search keyword sets listed after the input search keywords in the search keyword chains a set of search keywords whose category of industry is the same as that of the received search keyword as recommended search keywords.

6. The method of claim 4, wherein determining the recommended search keywords includes:
calculating probabilities of different later-listed search keyword sets occurring among all later-listed search keyword sets; and
selecting, based on the probabilities, search keyword sets that are most likely to occur as recommended search keywords.

7. The method of claim 1, further comprising:
determining, based on pre-stored search keyword sets and their corresponding categories of industry, related categories of industry corresponding to the received search keyword set;
determining click factor attribute values of the received search keyword set for each related category of industry;
determining probabilities of the received search keyword set belonging to the related categories of industry based at least in part on the determined click factor attribute values;
determining numbers of recommended keywords corresponding to the related categories of industry based on the probabilities; and
wherein executing the first recommendation method to obtain recommended search keywords includes determining recommended search keywords for the related category of industry.

8. The method of claim 1, wherein the set of search keywords with a plurality of predetermined words corresponding to intentions that are clearly defined includes words or phrases that clearly correspond to an entity or thing.

9. A method comprising:
receiving a set of search keywords input by a user;
determining whether the set of search keywords indicate a clearly defined intention by the user, including comparing the set of search keywords with a plurality of predetermined words corresponding to intentions that are not clearly defined; and
in the event that the set of search keywords are determined not to indicate a clearly defined intention, executing a first recommendation method to obtain recommended search keywords;
wherein:
the first recommendation method is selected among a plurality of recommendation methods; and
the first recommendation method includes a knowledge-based recommendation method, a session correlation-based method, or a combination; and
wherein the knowledge-based recommendation method comprises:
obtaining a plurality of lexical item sets based on search logs;
selecting a lexical item set from the plurality of lexical item sets, the selected lexical item set includes one or more lexical items that best match the set of search keywords;
selecting a selected rule from a stored rule set, wherein each rule in the stored rule set includes a priority-sequenced chain of lexical item types, and in the selected rule, the lexical item type of the selected lexical item set is the first item in the corresponding priority-sequenced chain;
identifying a second lexical item type in the priority-sequenced chain in the selected rule; and
determining a lexical item that is in the set of the second lexical item type and that logically corresponds to the received search keyword set as one of the recommended search keywords.

10. The method of claim 9, wherein the plurality of lexical item sets include a compound-type lexical item set, a mono-type lexical item set, a brand-type lexical item set, and a product model-type lexical item set.

11. A system comprising:
one or more processors configured to:
receive a set of search keywords input by a user;
determine whether the set of search keywords indicate a clearly defined intention by the user, including comparing the set of search keywords with a plurality of predetermined words corresponding to intentions that are not clearly defined, and comparing the set of search keywords with a plurality of predetermined words corresponding to intentions that are clearly defined;
in the event that the set of search keywords are determined not to indicate a clearly defined intention, execute a first recommendation method to obtain recommended search keywords; wherein:
the first recommendation method is selected among a plurality of recommendation methods;
record a first exposure to feedback rate of a knowledge-based recommendation method and a second exposure to feedback rate of a session correlation-based recommendation method; and
adjust the first proportion of recommended keywords contributed by the knowledge-based recommendation method for future received search keyword sets, and the second proportion of recommended keywords contributed by the session correlation-based recommendation method for future received search keyword sets;
wherein:
the first recommendation method includes a combination of at least the knowledge-based recommendation method and the session correlation-based recommendation method; and
the knowledge-based recommendation method contributes to a first proportion of recommended keywords and the session correlation-based recommendation method contributes to a second proportion of recommended keywords; and
one or more memories coupled to the one or more processors, configured to provide the one or more processors with instructions.

12. The system of claim 11, in the event that the set of search keywords are determined to indicate a clearly defined intention, the one or more processors are further configured to execute a second recommendation method to obtain additional recommended search keywords.

13. The system of claim 12, wherein the second recommendation method includes a search log-based recommendation method.

14. The system of claim 11, wherein the session correlation-based recommendation method comprises:
storing search keyword chains corresponding to search sessions by users;
identifying a plurality of search keyword sets listed after the received search keyword set in the stored search keyword chain comprising the received search keyword set; and
determining the recommended search keywords based on positions of the plurality of search keyword sets.

15. The system of claim 14, wherein determining the recommended search keywords includes:
based on pre-stored sets having lexical items of various categories of industries, selecting from the search keyword sets listed after the input search keywords in the search keyword chains a set of search keywords whose category of industry is the same as that of the received search keyword as recommended search keywords.

16. The system of claim 14, wherein determining the recommended search keywords includes:
calculating probabilities of different later-listed search keyword sets occurring among all later-listed search keyword sets; and
selecting, based on the probabilities, search keyword sets that are most likely to occur as recommended search keywords.

17. The system of claim 8, further comprising:
determining, based on pre-stored search keyword sets and their corresponding categories of industry, related categories of industry corresponding to the received search keyword set;
determining click factor attribute values of the received search keyword set for each related category of industry;
determining probabilities of the received search keyword set belonging to the related categories of industry based at least in part on the determined click factor attribute values;
determining numbers of recommended keywords corresponding to the related categories of industry based on the probabilities; and
wherein executing the first recommendation method to obtain recommended search keywords includes determining recommended search keywords for the related category of industry.

18. A system comprising:
one or more processors configured to:
receive a set of search keywords input by a user;
determine whether the set of search keywords indicate a clearly defined intention by the user, including comparing the set of search keywords with a plurality of predetermined words corresponding to intentions that are not clearly defined, and comparing the set of search keywords with a plurality of predetermined words corresponding to intentions that are clearly defined; and
in the event that the set of search keywords are determined not to indicate a clearly defined intention, execute a first recommendation method to obtain recommended search keywords;
wherein:
the first recommendation method is selected among a plurality of recommendation methods; and
the first recommendation method includes a knowledge-based recommendation method, a session correlation-based method, or a combination; and
wherein the knowledge-based recommendation method comprises:
obtaining a plurality of lexical item sets based on search logs;
selecting a lexical item set from the plurality of lexical item sets, the selected lexical item set includes one or more lexical items that best match the set of search keywords;
selecting a selected rule from a stored rule set, wherein each rule in the stored rule set includes a priority-sequenced chain of lexical item types, and in the selected rule, the lexical item type of the selected lexical item set is the first item in the corresponding priority-sequenced chain;
identifying a second lexical item type in the priority-sequenced chain in the selected rule; and
determining a lexical item that is in the set of the second lexical item type and that logically corresponds to the received search keyword set as one of the recommended search keywords; and one or more memories coupled to the one or more processors, configured to provide the one or more processors with instructions.

19. The system of claim 18, wherein the plurality of lexical item sets include a compound-type lexical item set, a mono-type lexical item set, a brand-type lexical item set, and a product model-type lexical item set.

20. A computer program product for search keyword recommendation, the computer program product being embodied in a tangible non-transitory computer readable storage medium and comprising computer instructions for:
receiving a set of search keywords input by a user;
determining whether the set of search keywords indicate a clearly defined intention by the user, including comparing the set of search keywords with a plurality of predetermined words corresponding to intentions that are not clearly defined, and comparing the set of search keywords with a plurality of predetermined words corresponding to intentions that are clearly defined;
in the event that the set of search keywords are determined not to indicate a clearly defined intention, executing a first recommendation method to obtain recommended search keywords; wherein:
the first recommendation method is selected among a plurality of recommendation methods;
recording a first exposure to feedback rate of a knowledge-based recommendation method and a second exposure to feedback rate of a session correlation-based recommendation method; and
adjusting the first proportion of recommended keywords contributed by the knowledge-based recommendation method for future received search keyword sets, and the second proportion of recommended keywords contributed by the session correlation-based recommendation method for future received search keyword sets,
wherein:
the first recommendation method includes a combination of at least the knowledge-based recommendation method and the session correlation-based recommendation method; and
the knowledge-based recommendation method contributes to a first proportion of recommended keywords and the session correlation-based recommendation method contributes to a second proportion of recommended keywords.

21. A computer program product for search keyword recommendation, the computer program product being embodied in a tangible non-transitory computer readable storage medium and comprising computer instructions for:
receiving a set of search keywords input by a user;
determining whether the set of search keywords indicate a clearly defined intention by the user, including comparing the set of search keywords with a plurality of predetermined words corresponding to intentions that are not clearly defined, and comparing the set of search keywords with a plurality of predetermined words corresponding to intentions that are clearly defined; and
in the event that the set of search keywords are determined not to indicate a clearly defined intention, executing a first recommendation method to obtain recommended search keywords;
wherein:
the first recommendation method is selected among a plurality of recommendation methods; and
the first recommendation method includes a knowledge-based recommendation method, a session correlation-based method, or a combination; and wherein the knowledge-based recommendation method comprises:
obtaining a plurality of lexical item sets based on search logs;
selecting a lexical item set from the plurality of lexical item sets, the selected lexical item set includes one or more lexical items that best match the set of search keywords;
selecting a selected rule from a stored rule set, wherein each rule in the stored rule set includes a priority-sequenced chain of lexical item types, and in the selected rule, the lexical item type of the selected lexical item set is the first item in the corresponding priority-sequenced chain;
identifying a second lexical item type in the priority-sequenced chain in the selected rule; and
determining a lexical item that is in the set of the second lexical item type and that logically corresponds to the received search keyword set as one of the recommended search keywords.

* * * * *